Nov. 26, 1940.                R. H. WENTORF                 2,222,791
                           FOOD PREPARING UTENSIL
                           Filed June 29, 1938              2 Sheets-Sheet 1
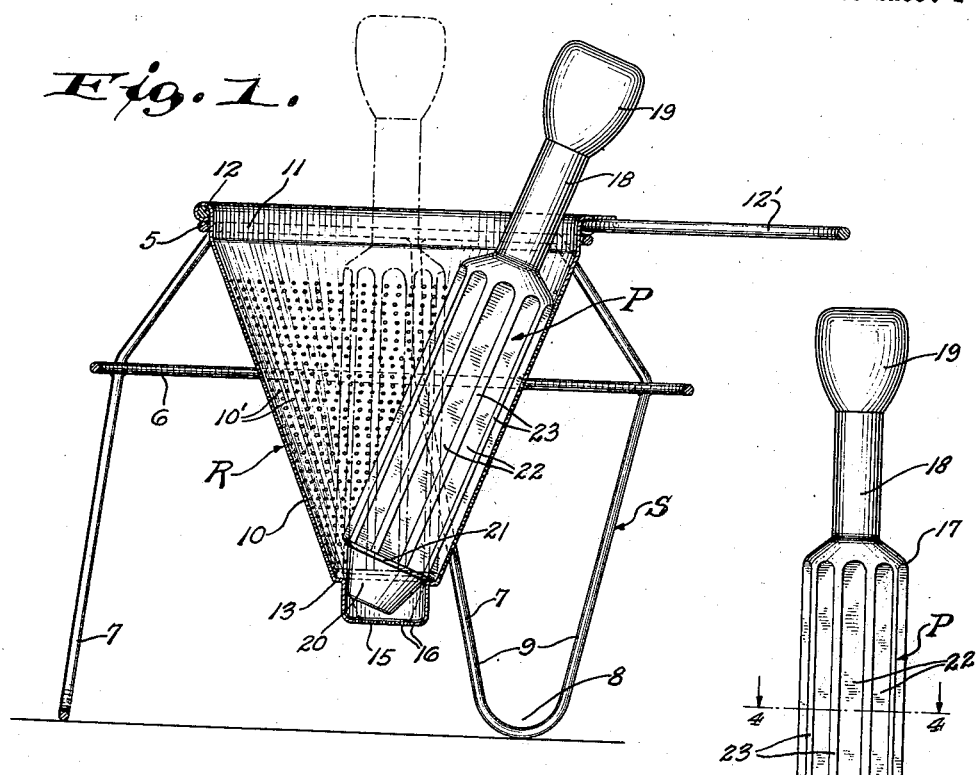
Fig. 1.
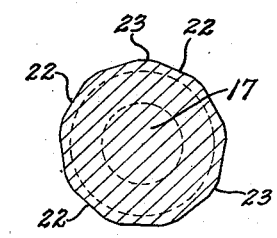
Fig. 3.
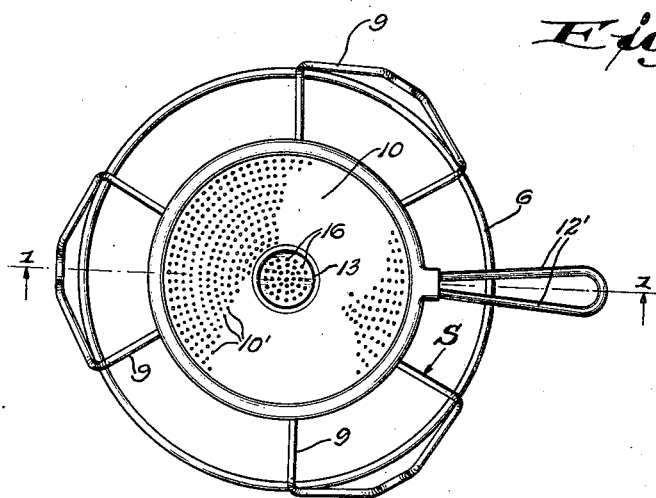
Fig. 2.
Fig. 4.
INVENTOR.
Robert H. Wentorf
BY
ATTORNEYS Nov. 26, 1940.　　　R. H. WENTORF　　　2,222,791
FOOD PREPARING UTENSIL
Filed June 29, 1938　　　2 Sheets-Sheet 2

INVENTOR
ROBERT H. WENTORF
BY John W. Michael
ATTORNEY

Patented Nov. 26, 1940

2,222,791

UNITED STATES PATENT OFFICE 2,222,791

FOOD PREPARING UTENSIL

Robert H. Wentorf, West Bend, Wis., assignor to West Bend Aluminum Company, West Bend, Wis., a corporation of Wisconsin Application June 29, 1938, Serial No. 216,560

8 Claims. (Cl. 146—172)

This invention relates to an improvement in food preparing utensils of the type designed for ricing potatoes, crushing fruits, or similarly preparing other kinds of foods.

The present application is a continuation in part of my application for "Food preparing utensil" filed January 4, 1936, Serial No. 57,479.

One of the objects of the invention is to provide a utensil of this character which may be very conveniently employed and effects a very thorough crushing and lightening of the food without detracting from its nutrient qualities or impairing its flavor or taste.

Another object is to provide a device of this character of the type having an inverted conical food receiving receptacle, the body of which is perforated, and with which a rotatable and bodily movable pestle reacts and wherein the coaction between the active surfaces of the pestle and the cooperable perforated wall of the receptacle is highly improved to make the action more thorough and uniform as well as more rapid and to aid in the expression from the apertures of the receptacle of all of the eatable portions of the food while retaining the undesirable portions such as skins, peelings, or the like.

A further object is to accomplish this result in a device of this character with greater facility than heretofore possible and this end is attained in a large degree by improving the formations of the lower end of the pestle and receptacle so that while the pestle may be freely rotated about its own axis and freely moved in a path corresponding to the formation of the interior of the receptacle it will not partake of uncontrolled movements and will not be unlodged or tend to set up undue vibrations.

Another object of the invention is to provide an improved mounting for the receptacle.

A still further object is to provide a utensil of this character which is simple in construction, reliable and effective in operation, easily handled and cleaned and simple and comparatively inexpensive to manufacture.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view partly in side elevation and partly in transverse vertical section taken on line 1—1 of Figure 2 and showing one embodiment of the invention;

Figure 2 is a plan view of the structure shown in Figure 1, the pestle being omitted;

Figure 3 is a detail view showing the pestle in elevation;

Figure 4 is a view in transverse cross section taken on line 4—4 of Figure 3;

Figure 5:
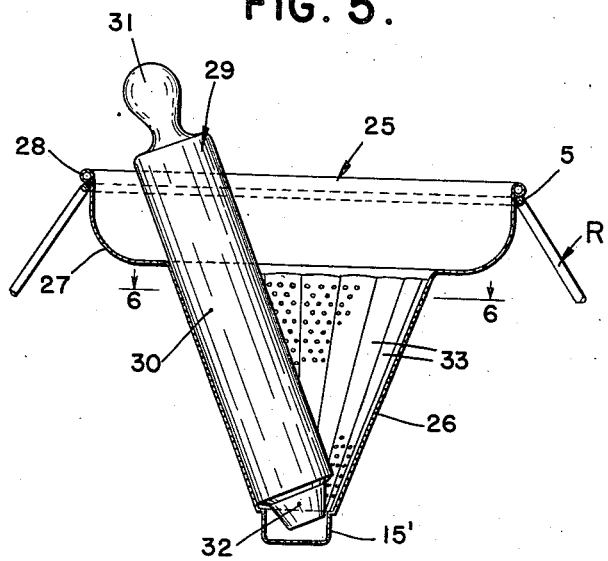
Figure 5 is a fragmentary view partly in side elevation and partly in transverse vertical section showing another embodiment of the invention, portions only of the stand or support being illustrated.

Referring to the drawings, and more particularly to Figures 1 to 4 inclusive, it will be seen that a utensil embodying the present invention comprises generally a stand or support designated at S, a receptacle designated at R and a pestle P. While the stand S may be constructed in a number of ways, it may advantageously be constituted of an upper small ring 5 and a lower larger ring 6, both rings being spaced when in use above the supporting surface on which the utensil rests by means of a plurality of legs designated generally at 7. Usually three such legs are provided and each consists of a piece of rod-like metal having generally V-shape with a rounded base 8 and diverging legs 9. Above the large ring 6 the legs 9 are inclined inwardly to enable them to be soldered not only to the ring 6 but also to the ring 5 and between the rings 6 and 5 the legs may converge toward the ring 5.

The receptacle R comprises a body portion 10 and having the general form of an inverted cone and is provided with a multiplicity of small apertures, as illustrated at 10' in the drawings. The upper end of the conical portion of the receptacle is integral with a vertical short cylindrical section 11, the upper edge of which is rolled about a reinforcing wire ring 12 and provides a shoulder which may be conveniently supported on the upper ring 5 of the stand. The short cylindrical section 11 effectively centers the receptacle in the upper ring 5 of the stand. The ring 12 may be extended radially from the curled upper edge of the receptacle to provide a handle 12'.

The lower portion of the receptacle is provided with a tapered shoulder 13 and below the shoulder with a cylindrical socket 15 which also may be formed with a number of perforations 16.

The pestle P which may be conveniently made of wood has a body 17, a reduced neck 18, a knob or handle 19 and at its lower end a tapered bearing portion 20 projecting below a slightly tapered shoulder 21 which intervenes between the body 17 and the portion 20.

The peripheral surface of the body 17 is provided with a multiplicity of longitudinally extending relatively broad flats 22 and with a corresponding number of longitudinally extending relatively narrow flats 23, the flats 22 and 23 alternating about the circumference of the body of the pestle.

When the pestle is operatively positioned in the receptacle its shoulder 21 rests on the shoulder 13 of the receptacle and the tapered stud 20 at the lower end of the pestle projects into the bearing socket 15. Now then, if the handle or knob 19 be grasped and the pestle rotated around the upper part of the receptacle while the knob 19 is left free to rotate in the palm of the hand the flats 22 and 23 will carry material such as potatoes deposited in the receptacle up to the inner surface of the receptacle and the flats 22 and 23 will pound and press the material through the apertures of the body portion 10. The action may be carried out very rapidly as the coacting shoulders 13 and 21 and the coacting stud 20 and sockets 15 very effectively confine the pestle to its proper movements.

It has been found that the flats on the surface of the pestle very markedly improve the action of a utensil of this character. Not only in properly and efficiently expressing the eatable portions of the food in the receptacle but also in the collection and retention on the pestle of the skins, peelings, or the like. The action of the pestle is in the nature of a rotary pounding and rubbing action.

Figure 6:
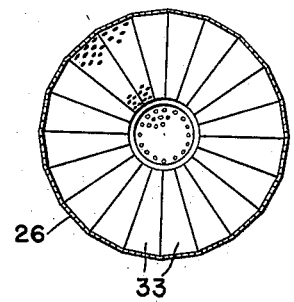
Figure 6 is a view in horizontal cross section taken on line 6—6 of Figure 5, the pestle being omitted.

In the embodiment of the invention shown in Figures 5 and 6 the receptacle designated generally at 25 is supported in the stand R as before. The receptacle 25 has a perforated conical body portion 26. At the upper end of this body portion 26 and integral therewith is an outwardly flared or enlarged trough formation 27, the upper marginal edge of which is provided with a rolled bead 28 adapted to have supporting engagement with the upper ring 5 of the stand R. The trough-like structure 27 is imperforate and is provided to receive the excess of potatoes or other vegetables being treated and prevent spilling of the same.

The pestle employed with this embodiment of the invention is designated generally at 29 and has a cylindrical body portion 30 provided at its upper end with a knob or handle 31 and formed at its lower end with a tapered bearing portion or stud 32 which projects into the bearing socket 15' formed at the lower end of the receptacle as before. While the pestle 29 has a cylindrical body portion, the body portion 26 of the receptacle is provided with a series of longitudinally extending flats 33, that is, the body portion 26 of the receptacle is in the form of a many sided polygon in horizontal cross section rather than circular. With this construction when the pestle is manipulated in the manner previously described a corresponding pounding and rubbing as well as squeezing action will ensue.

Figure 7:
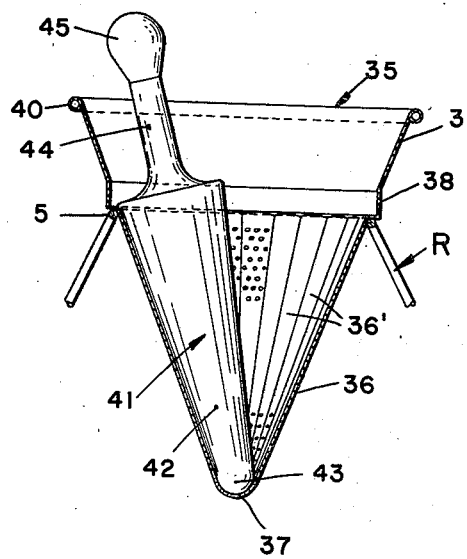
Figure 7 is a view similar to Figure 5 but showing another form of the invention.

In the form of the invention shown in Figure 7 the receptacle is designated at 35 and is supported on the stand R as before. The receptacle 35 has a perforated conical body portion 36 which is uniformly tapered to its lower end 37. Just above the perforated body portion of the receptacle and integral therewith is an outwardly imperforate annular shoulder or supporting rib 38 which has supporting engagement with the upper ring 5 of the stand. Integral with the supporting shoulder 38 and flaring upwardly and outwardly therefrom is an imperforate neck 39, the upper marginal edge of which is preformed with a rolled bead 40. In this form of the invention a pestle designated at 41 has a tapered or conical body portion 42, the rounded lower end 43 of which is in rotative engagement with the lower end portion 37 of the body of the receptacle. The upper end of the pestle has an integral handle 44 of reduced cross section terminating at its upper extremity in a knob-like end 45. In this case also the body portion 36 of the receptacle is preferably formed with a series of adjacent longitudinally extending flats 36', that is to say, the body portion of the receptacle is in the form of a many sided polygon in horizontal cross section. These flats 36' taper or narrow toward their lower ends. When the pestle is manipulated the flats of the receptacle coact therewith to exert a squeezing, rubbing and pounding action on the material in the receptacle.

Figure 8:
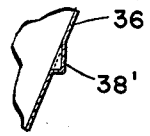
Figure 8 is a fragmentary view in section showing a slight modification of the structure illustrated in Figure 7.
Figure 9:
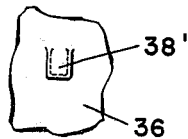
Figure 9 is a view in elevation of the structure shown in Figure 8.

In lieu of having a continuous annular supporting rib 38 the receptacle 36 may be provided with a plurality of angularly spaced supporting lugs 38' which may be pressed out of the material of the receptacle in the manner illustrated in Figures 8 and 9.

While I have shown and described several constructions in which the invention may be advantageously embodied, it is to be understood that the constructions shown have been selected merely for the purpose of illustration or example and that various changes in the size, shape and arrangement of the parts may be made without departing from the spirit of the invention or the scope of the subjoined claims.

The invention claimed is:

1. A utensil of the character described comprising a receptacle having a perforated body portion of inverted conical form, said body portion having a socket integral with its lower end, there being an annular shoulder between said body portion and said socket, and a single-piece wooden pestle having an annular shoulder adjacent its lower end engageable with and rollable upon the shoulder of the receptacle and having a reduced and tapered stud-like extension projecting below said shoulders and having rolling engagement with the peripheral wall of the socket to constrain the pestle to proper movements.

2. A utensil of the character described comprising a receptacle having a perforated body portion of inverted coni-form, said body portion having a socket integral with its lower end, there being an annular shoulder between said body portion and said socket, and a pestle having an annular shoulder adjacent its lower end engageable with and rollable upon the shoulder of the receptacle and having a stud-like extension projecting below said shoulders and having its peripheral surface in rolling engagement with the peripheral wall of the socket and having its lower end within the socket and spaced above the bottom wall thereof.

3. A utensil of the character described comprising a receptacle having a perforated body portion of inverted conical form, a socket formation at the lower end of the body portion, there being an annular shoulder between said body portion and said socket, and a pestle having an annular shoulder adjacent its lower end engageable with and rollable upon the shoulder of the receptacle, said pestle also having a reduced and tapered stud-like extension projecting below said shoulders and having its periphery in rolling engagement with the wall of the socket and its lower end disposed above the bottom of the socket.

4. A utensil of the character described comprising an upright receptacle having a vertically disposed perforated body portion of inverted conical form, a pestle having its lower end rollably and rockably interfitted with the lower end of said body portion of the receptacle, said pestle being inclined with respect to the vertical axis of the receptacle and having the peripheral surface of its body portion engageable with the inner peripheral surface of the body portion of said receptacle, said pestle being rollable around the inner peripheral surface of the body portion of the receptacle and movable transversely back and forth with respect thereto, said pestle being provided with a series of longitudinally extending flats whereby the pestle and body portion of the receptacle cooperate to exert a pounding, rubbing and squeezing action on the material in the receptacle as the pestle is twirled therein and partakes of its rolling and transverse movements relative to the receptacle.

5. A utensil of the character described comprising an upright receptacle having a vertically disposed perforated body portion of inverted conical form, a pestle having its lower end rollably and rockably interfitted with the lower end of said body portion of the receptacle, said pestle being inclined with respect to the vertical axis of the receptacle and having the peripheral surface of its body portion engageable with the inner peripheral surface of the body portion of said receptacle, said pestle being rollable around the inner peripheral surface of the body portion of the receptacle and movable transversely back and forth with respect thereto, said receptacle being provided with a series of longitudinally extending flats whereby the pestle and body portion of the receptacle cooperate to exert a pounding, rubbing and squeezing action on the material in the receptacle as the pestle is twirled therein and partakes of its rolling and transverse movements relative to the receptacle.

6. A utensil of the character described comprising an upright receptacle element having a vertically disposed perforated body portion of inverted conical form, a pestle element having its lower end rollably and rockably interfitted with the lower end of the body portion of the receptacle element, said pestle element being inclined with respect to the vertical axis of the receptacle element and having the peripheral surface of its body portion engageable with the inner peripheral surface of the body portion of the receptacle element, said pestle element being rollable about the inner peripheral surface of the body portion of the receptacle element and also movable transversely back and forth with respect thereto, at least one of said elements having a series of longitudinally extending flats whereby the elements coact to exert a pounding, rubbing, and squeezing action on the material in the receptacle element as the pestle element is twirled therein and partakes of its rolling and transverse movements relative to the receptacle element.

7. A utensil of the character described comprising an upright receptacle having a perforated body portion of inverted conical form, said body portion having a socket at the lower end thereof including a cylindrical peripheral wall and a pestle cooperable with the receptacle and inclined with respect to the vertical axis thereof in its operative position, said pestle having a stud-like extension at its lower end, said stud-like extension being tapered, the angle of the taper of the stud-like extension being equal to the angle of inclination of the pestle with respect to the vertical axis of the receptacle whereby when said stud-like extension of the pestle and the socket are interfitted the periphery of the stud-like extension is in rolling contact with the cylindrical peripheral wall of the socket.

8. A utensil of the character described comprising a receptacle having a perforated body portion of inverted conical form, said body portion having a socket integral with its lower end and made up of a cylindrical peripheral wall and a bottom wall, and a pestle having an integral stud-like extension at its lower end, said stud-like extension being tapered at such an angle that when the pestle is positioned in the receptacle and the stud-like extension is interfitted with the socket its peripheral wall is vertically disposed and is in rolling engagement with the peripheral wall of the socket.

ROBERT H. WENTORF.